United States Patent
Mazyar et al.

(10) Patent No.: US 9,404,334 B2
(45) Date of Patent: Aug. 2, 2016

(54) DOWNHOLE ELASTOMERIC COMPONENTS INCLUDING BARRIER COATINGS

(75) Inventors: Oleg A. Mazyar, Houston, TX (US); Rocco DiFoggio, Houston, TX (US); Valery N. Khabashesku, Houston, TX (US); Kristine N. Ludwig, Houston, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 373 days.

(21) Appl. No.: 13/600,626

(22) Filed: Aug. 31, 2012

(65) Prior Publication Data

US 2014/0060811 A1  Mar. 6, 2014

(51) Int. Cl.
| | |
|---|---|
| *E21B 10/22* | (2006.01) |
| *E21B 10/25* | (2006.01) |
| *E21B 4/00* | (2006.01) |
| *E21B 33/10* | (2006.01) |
| *E21B 49/08* | (2006.01) |
| *F16J 15/00* | (2006.01) |
| *F16J 15/10* | (2006.01) |
| *F16J 15/12* | (2006.01) |

(52) U.S. Cl.
CPC ............. *E21B 33/10* (2013.01); *E21B 4/003* (2013.01); *E21B 10/22* (2013.01); *E21B 10/25* (2013.01); *E21B 49/08* (2013.01); *E21B 49/082* (2013.01); *F16J 15/00* (2013.01); *F16J 15/102* (2013.01); *F16J 15/104* (2013.01); *F16J 15/128* (2013.01)

(58) Field of Classification Search
CPC ......... E21B 4/003; E21B 10/22; E21B 10/25; E21B 2010/225; E21B 33/10
USPC ......... 166/179, 242.1; 175/371; 277/322, 331
See application file for complete search history.

(56) References Cited

U.S. PATENT DOCUMENTS

| | | | |
|---|---|---|---|
| 4,809,876 A | 3/1989 | Tomaswick et al. | |
| 4,987,007 A | 1/1991 | Wagal et al. | |
| 5,009,100 A | 4/1991 | Gruber et al. | |
| 5,105,879 A * | 4/1992 | Ross | 166/195 |
| 5,985,451 A * | 11/1999 | Senda et al. | 428/408 |
| 6,045,916 A | 4/2000 | Shimamura et al. | |
| 6,123,991 A * | 9/2000 | Spallek et al. | 427/248.1 |

(Continued)

FOREIGN PATENT DOCUMENTS

| | | |
|---|---|---|
| CN | 102278069 A | 12/2011 |
| EP | 1340835 B1 | 10/2006 |

(Continued)

OTHER PUBLICATIONS

Abbas, et al. "Structural investigation and gas barrier performance of diamond-like carbon based films on polymer substrates". Science Direct, Carbon, 43, (2005), 303-309.

(Continued)

*Primary Examiner* — Jennifer H Gay
(74) *Attorney, Agent, or Firm* — Cantor Colburn LLP

(57) ABSTRACT

An apparatus for performing a downhole operation includes a carrier configured to be disposed in a borehole in an earth formation, and a deformable component configured to be disposed in the borehole. The deformable component includes an elastomeric material and a barrier coating disposed on a surface of the elastomeric material. The barrier coating has properties configured to resist permeation of downhole gases into the elastomeric material at downhole temperatures.

19 Claims, 3 Drawing Sheets

(56) References Cited

U.S. PATENT DOCUMENTS

| | | | |
|---|---|---|---|
| 6,136,386 | A | 10/2000 | Nakahigashi et al. |
| 6,209,185 | B1 | 4/2001 | Scott |
| 6,589,619 | B1 | 7/2003 | Nagashima |
| 6,843,480 | B2 | 1/2005 | Nelson et al. |
| 7,029,752 | B2 | 4/2006 | Hama et al. |
| 7,234,541 | B2 | 6/2007 | Scott et al. |
| 8,012,586 | B2 | 9/2011 | Extrand et al. |
| 8,146,889 | B2 | 4/2012 | Hunter |
| 2003/0124229 | A1 | 7/2003 | Hama et al. |
| 2004/0031624 | A1* | 2/2004 | Scott et al. ............ 175/371 |
| 2004/0031625 | A1* | 2/2004 | Lin et al. ............... 175/371 |
| 2005/0229851 | A1 | 10/2005 | Hama et al. |
| 2006/0169026 | A1 | 8/2006 | Kage et al. |
| 2006/0177575 | A1 | 8/2006 | Takemoto et al. |
| 2008/0236842 | A1* | 10/2008 | Bhavsar et al. ........ 166/381 |
| 2009/0061111 | A1 | 3/2009 | Mishima et al. |
| 2009/0321146 | A1 | 12/2009 | Dick et al. |
| 2010/0019456 | A1 | 1/2010 | Gerrard |
| 2010/0239867 | A1* | 9/2010 | Tsuchiya et al. ....... 428/422 |
| 2011/0061945 | A1 | 3/2011 | Saenger et al. |
| 2011/0156357 | A1 | 6/2011 | Noguchi et al. |
| 2011/0203790 | A1 | 8/2011 | Carstensen |
| 2011/0210521 | A1 | 9/2011 | Warren et al. |
| 2011/0220348 | A1 | 9/2011 | Jin et al. |
| 2012/0052215 | A1 | 3/2012 | Nakaya et al. |
| 2013/0014995 | A1* | 1/2013 | Scott et al. ............ 175/107 |
| 2014/0060811 | A1* | 3/2014 | Mazyar et al. .......... 166/118 |
| 2014/0185972 | A1* | 7/2014 | Kota et al. .............. 384/316 |

FOREIGN PATENT DOCUMENTS

| | | | |
|---|---|---|---|
| EP | 2290269 A1 * | 3/2011 | |
| WO | 2009002231 A2 | 12/2008 | |

OTHER PUBLICATIONS

Asakawa, et al. "Combining polymers with diamond-like carbon (DLC) for highly functionalized materials". Surface and Coatings Technology, 206 (2011) 676-685.

Brody, "Barrier Coatings Fortify Plastic Bottles". Emerging Technology. Brand Packaging 11, Mar. 2003. 1 page.

Cione, et al. Deposition and Wettability of [bmim][triflate] on Self-Assembled Monolayers, J. Phys. Chem. C, 2009, 113, 2384-2392.

Erlat, et al. "SiOx Gas Barrier coatings on Polymer Substrates: Morphology and Gas Transport Considerations". J. Phys. chem. B 1999, 103, 6047-6055.

F-DLC, Our F-DLC coated rubber O-ring for the compact zoom camera won the Technology Prize of the Japanese Society of Tribologist! Nippon ITF Inc., May 24, 2002 (May 24, 2006) [retrieved on Jun. 6, 2012]. Retrieved from the internet:,URL:http://www.nippon-itf.co.jp/english/tp020524en.html.

F. Bodino, et al. "Alumina coating on polyethylene terephthalate", Thin Solid Films, vol. 241, Apr. 1994, pp. 21-24.

Gitis, et al. "Comprehensive Mechanical and Tribological Characterization of Ultra-Thin-Films" Matter. Res. soc. Symp. Proc. vol. 1049, 2008 Materials Research Society. 1049-AA02-04. 6 pages.

Henry, et al. "Characterization of transparent aluminium oxide and indium tin oxide layers on polymer substrates". Thin Solid Films 382 (2001) 194-201.

J. Robertson, "Advances in Diamond-like Carbon". J. Robertson, Mat. Sci. Eng. Rep. 37 129 (2002). 79 pages.

J. Robertson, "Diamond-like amorphous carbon" Materials Science and engineering R 37 (2002) 129-281. Reports: A review Journal.

K. Ozeki, et al. "Gas Barrier properties of diamond-like carbone films coated on PTFE", Applied Surface Science (2009) vol. 255, issue 16 pp. 7286-7290.

Korner, Lutz. "Diffusion Barrier Coatings for Polymer Containers Processed by Plasma Enhanced Chemcial Vapor deposition". Diss. ETH No. 19023. A dissertation submitted to ETH Zurich for the degree of Doctor of Sciences. 2010. 177 pages.

Kroger, et al. "Diffusion in diamond-like carbon" Science Direct, Diamond and Related Materials, 12 (2003) 2042-2050.

Martinez, et al. "Application of diamond-like carbon coatings to elastomers frictional surfaces". Tribology International 42 (2009) 584-590.

Pei, et al. "Tribological behavior of W-DLC coated rubber seals". Science Direct. Surface and Coatings Technology 202 (2008) 1869-1875.

Pet-Recycling, Plastic bottles: a diamond like coating (DLC), Feb. 2004 [retrieved on Nov. 9, 2012 (Sep. 12, 2012)]. Retrieved from the internet:,URL:http://WWW.petrecycling.cz/dlc_barrier_coating.htm.

Product Data Sheet, The Case for PVDF Coatings on flexible Vinyl Substrates. Leading Edge Coating Solutions. pp. 1-6.

"Elastomeric seals for rapid gas decompression applications in high pressure services" Prepared by BHR Group Limited for the Health and Safety Executive 2006 Research Report 485, 74 pages.

Tusbone, et al. "Gas barrier properties and periodically fractured surface of thin DLC films coated on flexible polymer substrates". Science Direct, Surface & Coatings Technology 201, (2007) 6431-6436.

Tydex., Hard Carbon Coating (DLC: "Diamond-Like Coating"), [retrieved on Nov. 9, 2012]. Retrieved from the internet:,URL:http://www.tydexoptics.com/materials1/coatings/dlccoatings/.

Vainonen, et al. "Hydrogen Migration in diamond-like carbon films". Journal of Applied Physics, vol. 82, issue 8, 3791-3796 (Oct. 15, 1997).

Notification of Transmittal of the International Search Report and the Written Opinion of the International Searching Authority, or the Declaration; PCT/US2013/057009; Dec. 4, 2013, 15 pages.

Tsubone, et al., "Fracture mechanics of diamond-like carbon (DLC) films coated on flexible polymer substrates", Science Direct, Surface & Coatings Technology 201 (2007) pp. 6423-6430.

* cited by examiner

DOWNHOLE ELASTOMERIC COMPONENTS INCLUDING BARRIER COATINGS

BACKGROUND

In many downhole operations, such as fluid sampling and logging operations, various components are equipped with sealing elements to provide a fluid-tight seal between various components, such as string segments, valve components, packer components and sampling components. Sealing elements, such as o-rings, are typically made from elastomer or plastic materials.

When used downhole, such sealing elements are exposed to harsh conditions, which can compromise their performance and result in failure. Types of failure include heat failure, mechanical failure (due to, e.g., stress, abrasion) and explosive decompression. Explosive decompression of O-rings or other elastomers occurs when gas, usually under high pressure and at high temperature, permeates an elastomer downhole over time. Later, if the pressure is reduced too quickly, such as by being brought back to the surface too rapidly, then the gas may not be able to get out quickly enough so the elastomer undergoes explosive decompression. This can result in damage to the O-ring in the form of, e.g., random ruptures, crater-like pores and small slits due to micro-explosions occurring as decompression takes place.

SUMMARY

An apparatus for performing a downhole operation includes: a carrier configured to be disposed in a borehole in an earth formation; and a deformable component configured to be disposed in the borehole, the deformable component including an elastomeric material and a barrier coating disposed on a surface of the elastomeric material, the barrier coating having properties configured to resist permeation of downhole gases into the elastomeric material at downhole temperatures.

A sealing apparatus includes a deformable component configured to be disposed in a borehole in an earth formation an provide a fluid-tight seal between downhole components or between a downhole component and a borehole, the deformable component including an elastomeric material and a barrier coating having properties configured to resist permeation of downhole gases into the elastomeric material at downhole temperatures.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

Apparatuses and methods for sealing downhole components and providing downhole elastomeric components are described herein. A downhole component, such as a downhole tool or borehole string component, includes at least one elastomeric or deformable element. The elastomeric element may be a sealing element such as an O-ring. The O-ring is made from an elastomer, e.g., a rubber or polymer material, or combination of elastomers and includes a barrier coating configured to protect the elastomeric element from downhole materials such as hot oil, brine, acids and alkalis, and to protect the elastomeric element from environmental effects such as gas diffusion, which can lead to explosive decompression and element failure.

The barrier coating, in one embodiment, is configured to resist or prevent diffusion of gases from the downhole environment into the elastomeric element. In one embodiment, the barrier coating is a diamond-like carbon coating (DLC). Other coatings that may be included as the barrier coating include a metal oxide coating (e.g., silicon dioxide and aluminum oxide), a polymer coating (e.g., polyimide, polyvinylidene chloride, polyethelene terephthalate polyphenylenesulfide), and a metallic coating (e.g., gold and titanium).

In one embodiment, the barrier coating includes an exterior layer or coating made from a "hard material" such as a diamond like carbon coating (DLC) or a metal oxide (e.g., silicon oxide and/or aluminum oxide) coating. The "hard" coating has a thickness that is small enough so that the coating is pliable and bends with the elastomer substrate. The rigidity of a beam goes as the cube of the beam thickness, which is why it is easy to bend an 80-micron fiber optic strand but not a quarter-inch plate of window glass, which will break rather than bend for the same radius of curvature. Specifically, flexural rigidity is given by $Eh^3/[12(1-v^2)]$ where E is Young's modulus, v is Poisson's ratio and h is the thickness of a plate. The benefits of coating O-rings or other elastomers with a thin layer of a diamond like carbon or other barrier coating include reducing gas influx into the elastomer, which could later cause explosive decompression, improving chemical resistance, and reducing friction. By preventing gas from entering the elastomer in the first place, the risk of explosive decompression is reduced.

Figure 1:
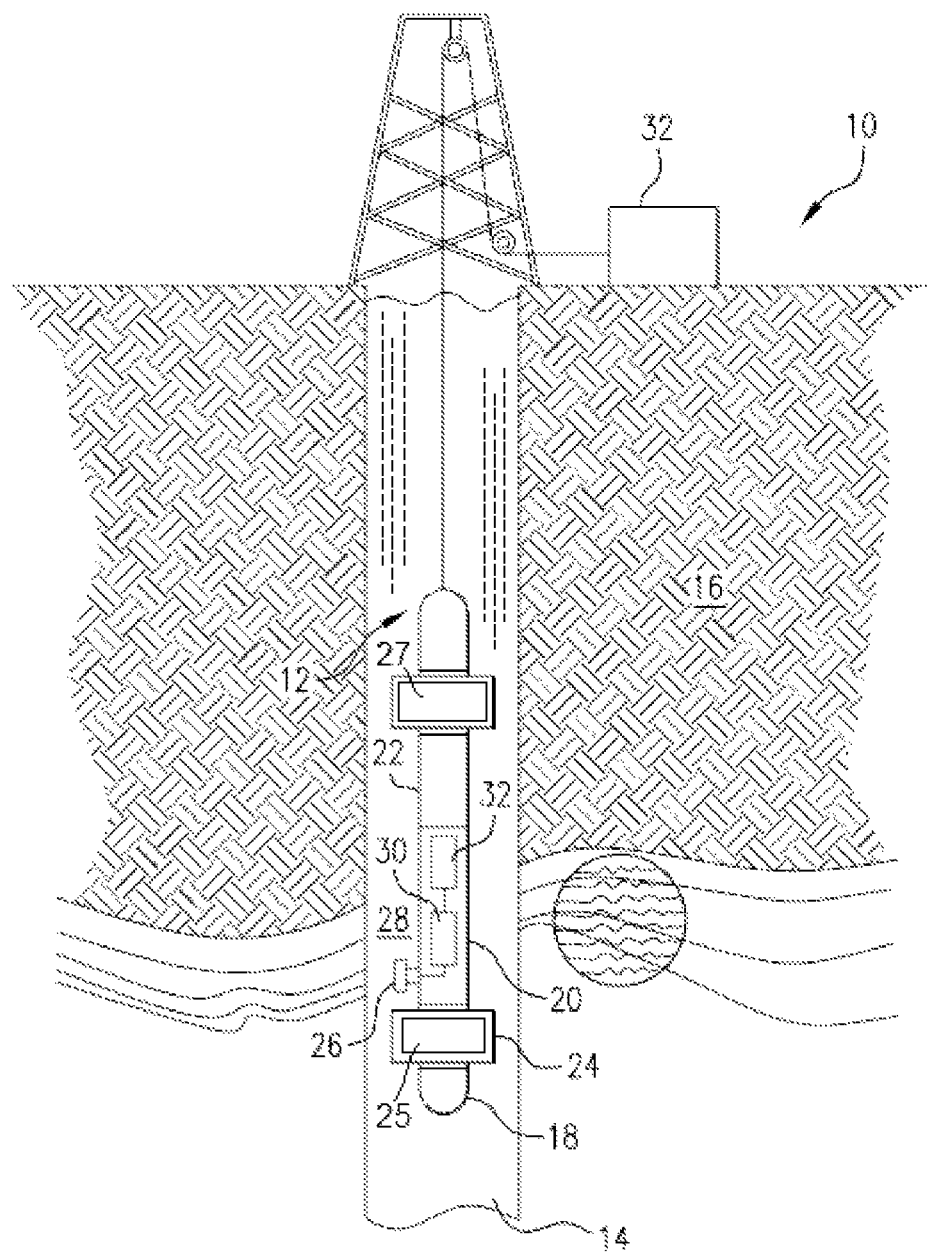
FIG. 1 is a side cross-sectional view of an embodiment of a subterranean well drilling, evaluation, exploration and/or production system.

Referring to FIG. 1, an exemplary embodiment of a subterranean well drilling, measurement, exploration and/or production system 10 includes a borehole string 12 that is shown disposed in a borehole 14 that penetrates at least one earth formation 16 during a subterranean operation. The borehole 14 may be an open or cased borehole. In one embodiment, the borehole string includes a downhole tool 18 such as a well logging or sampling tool. In this example, the downhole tool 18 is a wireline tool, but is not limited thereto. For example, the borehole string 12 may be made from, for example, a pipe, multiple pipe sections or flexible tubing. The downhole tool 18 can be incorporated with a drill string in, e.g., a bottomhole assembly (BHA) for use in drilling and/or logging-while-drilling (LWD) applications. The system 10 and/or the borehole string 14 include any number of downhole tools 18 for various processes including drilling, hydrocarbon production, and measurement of one or more physical quantities in or around a borehole.

The downhole tool 18 is not limited to the embodiments described herein, and may be disposed with any suitable carrier. A "carrier" as described herein means any device, device component, combination of devices, media and/or member that may be used to convey, house, support or otherwise facilitate the use of another device, device component, combination of devices, media and/or member. Exemplary non-limiting carriers include drill strings of the coiled tube type, of the jointed pipe type and any combination or portion thereof. Other carrier examples include casing pipes, wirelines, wireline sondes, slickline sondes, drop shots, downhole subs, bottom-hole assemblies, and drill strings.

The embodiment shown in FIG. 1 includes multiple sections or subs, such as a sampling module 20, an electronics module 22 and packer assemblies 24. The packer assemblies 24 are configured to form a seal between the string 12 and the borehole wall (or casing), and isolate regions of the borehole annulus. The sampling module 20 includes components to allow for retrieving and/or testing formation fluids and materials, such as water, hydrocarbons, gases and combinations thereof. The sampling module 20 in this embodiment includes a sampling port 26 in fluid communication with a flow line 28, and a sample chamber 30 and/or a fluid measurement device 32.

Electronics located, e.g., in the electronics sub 22, may be included for storing, transmitting and/or processing signals and/or data generated by the tool 18. In one embodiment, the tool 18 is equipped with transmission equipment to communicate ultimately to a surface processing unit 32. Such transmission equipment may take any desired form, and different transmission media and methods may be used. Examples of connections include wired, fiber optic, wireless connections and memory based systems.

Figure 2:
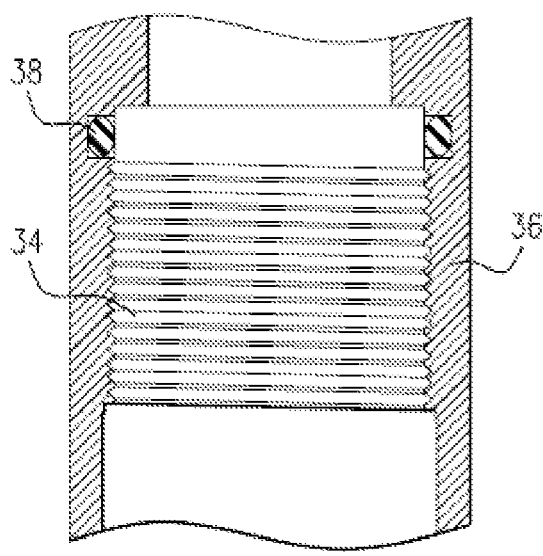
FIG. 2 is a side cross-sectional view of an embodiment of a connection mechanism including one or more O-rings or other elastomeric seals.

Various downhole components may include deformable or elastomeric materials. One application of such materials includes providing a fluid-tight seal around and/or between downhole components. For example, the tool 18 includes a housing having a connection mechanism for connecting the housing to other downhole components or, e.g., an end cap. An exemplary connection mechanism is shown in FIG. 2, which illustrates a connection between downhole components, e.g., the sampling module 20 and the electronics module 22.

In one embodiment, a downhole component such as a pressure housing, tool, module or sub (e.g., sampling module 20) includes a male coupling portion 34 having an exterior threaded section. Another component (e.g., the electronics module 22 or an end cap) includes a female coupling portion 36 having an interior threaded section. Although the male and female portions are described has having threaded portions, they may be configured to be coupled using any suitable mechanism, such as bolts or screws and an interference fit or combinations thereof. In this embodiment, the elastomeric element is at least one O-ring 38 disposed in the male and/or female portion to affect a fluid-tight seal between the segments.

Sealing elements may be included in other components. For example, the packer assemblies 24 may include O-rings, packer elements 25 and/or expandable bladders 27 made from elastomeric materials. In other examples, for measurement while drilling tools (MWD), a drill collar has "hatches" covering the electronics that reside in recesses on the outer diameter of the collar. These hatches include an O-ring to provide a fluid-tight seal between the hatch cover and the drill collar. In tools such as the sampling module 20, internal tubes that penetrate the main pressure housing of the sampling module 20 carry formation fluid that is pumped from the formation past sensors in the sampling module (such as between a pair of windows for optical readings) and then out to the well bore. These tubes may be sealed with O-rings. The embodiments described herein are suitable for any downhole component that uses O-rings or other elastomeric elements.

The elastomeric elements may be made from various elastomers or polymers having an elasticity sufficient to provide a fluid-tight seal between components. Such materials may be chosen that have low gas permeability to reduce gas influx. In one embodiment, the elastomer material has a durometer of at least 70-90 Shore A (e.g., 80 Shore A), which can be achieved with fillers if necessary. Any suitable elastomer may be used, such as synthetic rubber compounds, various polymers and thermoplastics. Exemplary elastomers include NBR Nitrile (Acrylonitrile-butadiene), HNBR (Hydrogenated acrylonitrile-butadiene), FKM-3 (Fluorocarbon terpolymer of fluorinated vinyl ether and vinylidene fluoride), FKM-4 (Fluorocarbon tetrapolymer of propylene and vinylidene fluoride), FEPM or FCM (Tetrafluoroethylene-propylene copolymer), and FFKM (Perfluoro elastomer).

Figure 3:
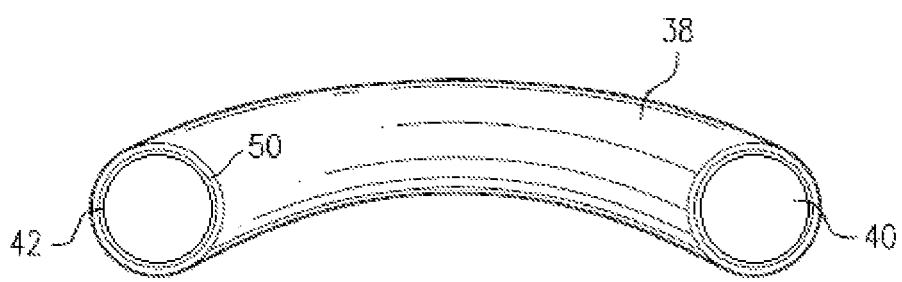
FIG. 3 is a perspective cross-sectional view of an embodiment of an elastomeric seal including a barrier coating.

One or more of the elastomeric elements, shown as an exemplary section of O-ring 38 in FIG. 3, includes an elastomer material 40 surrounded by a protective barrier coating 42 that is configured to reduce or prevent the diffusion of downhole gases into the elastomeric material 40, and protect the element from downhole environmental conditions and downhole materials, such as hydrocarbons, water, acids and/or alkalis.

In one embodiment, the barrier coating 42 is made from a gas impermeable material, which acts to reduce or prevent diffusion of gases into the elastomer, which could result in explosive decompression. Exemplary coatings include relatively hard materials (relative to the elastomer) such as diamond-like carbon coatings (DLC) and silicon dioxide (glass). Hard coatings such as DLC coatings, which could be considered an unreliable material to be deposited on a soft substrate (e.g., due to brittleness), can be effectively applied to a deformable or elastomeric substrate as sub-micron coatings, which are very pliable because the cube of their thickness is so small. DLC coatings may be any of various forms of amorphous carbon materials that display some properties of diamond (e.g., hardness, wear resistance and slickness). Silicon dioxide acts as an effective oxygen and carbon dioxide barrier. In one embodiment, the coating 42 has a thickness that allows the coating 42 to be pliable with the elastomer but retain the gas protective qualities, e.g., about 100 nm. For example, the DLC coating thickness is between 20 and at least a few hundred nm (e.g., 500 nm), which is thin enough to avoid a mismatch in coating versus substrate properties of modulus and thermal coefficient of expansion that could make it easier for the coating to crack. In addition, thinner coatings, particularly in this range, are more pliable and can deform as the elastomer substrate is deformed while making a seal.

For example, the elastomer is coated with a thin layer of diamond-like carbon or silicon dioxide, in the range of 20-40 nm, which reduces gas permeation by a factor of 10. Additional 20-40 nm coatings may be applied to increase resistance to gas permeation. For example, a second 30 nm layer of DLC coating may reduce the oxygen permeation by a factor of 10 squared (100), and a third 30 nm layer of DLC may reduce permeation by a factor of 10 cubed (1000), with comparable reductions for other gases such as methane, carbon dioxide, and hydrogen sulfide. In one embodiment, the DLC coating is a fluorinated DLC coating.

The DLC coating is very chemically inert in brine, gas, and oil at high downhole temperatures, is hard on the Moh scale to resist sand abrasion, and is also slick. The coating is configured to resist gas diffusion into the elastomeric element. For example, the DLC coating has a high activation energy (e.g., about 1-4 eV per molecule, which is about 23-92 kcal/mole) for gas diffusion in the Arrhenius equation, which is related to both its microstructure and its chemistry.

The DLC coating may be configured to resist diffusion of gas (e.g. hydrogen sulphide) into the coating. For example, the DLC includes a highly crystalline material have a closely spaced lattice. In one embodiment, the coating in one embodiment includes a high percentage of a closely spaced crystalline lattice. For example, the coating has a high percentage of $sp^3$ bonds, i.e., sufficient to resist or prevent diffusion of gas molecules therethrough. Exemplary DLC coatings have $sp^3$ fractions on the order of at least about 70-75%. Exemplary coatings include hydrogenated tetrahedral amorphous carbon (ta-C:H) (typically produced via PECVD methods) which has about 70% $sp^3$, and tetrahedral amorphous carbon (ta-C) which has about 80-88% $sp^3$.

In one embodiment, the barrier coating 42 includes a polyvinylidene chloride (PVDC) material. PVDC-based polymers exhibit low permeability to a wide range of gases and vapors and enhance resistance to oil, moisture and aggressive environments. Such PVDC films also exhibit low permeability to hydrogen sulphide. This polymer is stable up to 392 deg F. (200 deg C.). In one embodiment, the barrier coating is an epoxy amine coating. An exemplary coating is a thermoset epoxy amine such as Bairocade™, manufactured by PPG industries.

Figure 4:
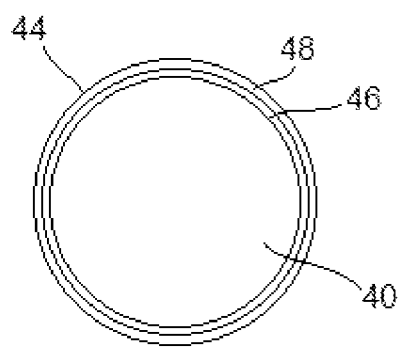
FIG. 4 is a cross-sectional view of an embodiment of an elastomeric seal include a combination barrier coating.

It is noted that the barrier coating 42 can be applied as a single coating or multiple coating layers. In addition, combination coatings may be applied, e.g., a DLC coating as a first layer(s) and a silica dioxide coating as a second layer(s). FIG. 4 shows an embodiment having a combination barrier coating 44 that includes a first DLC coating 46 and a second silica dioxide coating 48. Because an exterior coating is sensitive to abuse, a secondary coat that functions in synergy with the silica or DLC may applied to the surface of the coating.

In one embodiment, the barrier coating 42 includes a polyethelene terephthalate (PET) material. An exemplary PET material is a biaxially-oriented polyethelene terephthalate, known as Mylar, which exhibits low permeability to hydrogen sulphide. It has a high melting point of 489 deg F. (254 deg C.) and excellent mechanical properties.

Another exemplary coating material includes a polyvinylidene fluoride (PVDF) material. PVDF is resistant to solvents, acids, bases and heat. Another exemplary coating is polyimide, which is chemically resistant and can be used continuously to 232 C (450 F). Another exemplary coating is polyphenylene sulfide (PPS), which has a maximum service temperature of 218 C (424 F) and does not dissolve in any solvent below about 200 C (392 F).

An additional exemplary coating material is aluminum oxide (alumina). For example, the barrier coating may include a thin coating (e.g., about 10-200 nm thick) deposited on an elastomer (e.g., polyethylene terephthalate). An exemplary method for depositing such a coating is magnetron sputtering.

Although the coatings described herein are described as applied to elastomer materials, they are not so limited. For example, at least some of the coatings described herein may be applied to metal surfaces to prevent corrosion.

In one embodiment, the barrier coating 42 includes a fluorinated coating, such as a fluorinated DLC, silica or alumina coating. An exemplary coating includes an alumina and/or silica coating (or other suitable coating material) overcoated with a self-assembled monolayer, such as a fluorinated alkylsilane self-assembled monolayer, which can act as an effective barrier for $CO_2$ and $H_2S$ diffusion and, have a relatively low coefficient of friction. The self-assembled monolayers are not limited herein, and may include any suitable type of fluorinated or non-fluorinated materials.

Various methods for manufacturing elastomeric seals or other components including a barrier coating are described herein. In a first stage of a manufacturing method, the elastomeric element is formed. Formation may be accomplished using any suitable technique, such as casting, molding and extrusion. In a second stage of the method, one or more barrier coatings are applied to a surface of the formed elastomeric element. In a third optional stage, one or more additional protective coatings are applied to provide further protection from abrasion, heat, temperature or other effects. An example of an additional protective coating 50 is shown in FIG. 3. The manufactured components may be used to assemble or construct a downhole component, such as a borehole string, pipe segment or downhole tool. For example, the elastomeric elements are constructed as O-rings, packer elements or bladders and incorporated into the downhole component.

Various techniques or methods may be used to apply the barrier coating. For example, the barrier coating may be applied by chemical vapor deposition, evaporative deposition, spray deposition or any suitable method.

In one embodiment, various plasma deposition techniques are used to deposit or apply the barrier coating. One example includes using a radio-frequency (RF) plasma coating method. Another example includes Plasma Enhanced Chemical Vapor Deposition (PECVD), which uses a silicon-containing chemical to apply a microscopically thin layer of silicon oxide glass on one or more surfaces of an elastomer. A further example uses a Plasma Nano Shield (PNS) process that ionizes gases to produce a diamond-like coating. This technique can be used for fluorination of DLC coatings by admixing the fluorocarbon molecules (e.g., CF4, C2F6, etc.) to the gas feedstock and produce a CF3 and F— surface coated DLCs. By having CF3 groups or F atoms along the exposed surfaces of these coatings, these coatings become very chemically inert. Plasma coatings may be classified as carbon interior, silica interior and silica exterior. Another example is the Glaskin plasma coating process for depositing a silicon oxide coating on a surface.

In one embodiment, chemical vapor deposition (CVD) is used to apply one or more barrier coatings. DLC coatings usually produced from methane (CH4) as a feedstock can be fluorinated by inert gas diluted F2 gas under mild temperature conditions to result in the diamond coating that will be saturated with covalently bonded F— atoms to the surface which will act as a corrosive gas barrier for coated elastomer. One example of CVD is Combustion Chemical Vapor Deposition (CCVD).

A method of performing a downhole operation includes disposing a downhole component that includes an O-ring or other elastomeric component having a barrier coating as described herein. When the downhole component is disposed downhole, various operations can be performed, such as drilling operations, measurement operations, completion operations or production operations. In one embodiment, the elastomeric element functions as a seal to provide a water-tight seal between various portions of the downhole component, facilitates providing a seal to isolate portions of the borehole, or facilitates securing the downhole component in a selected location and/or position.

The apparatuses and methods described herein have various advantages over prior art apparatuses and techniques. The barrier coatings described herein greatly enhance the resistance of elastomeric components to explosive decompression by greatly reducing gas permeation into the elastomer in the first place, protecting the elastomer from chemical attack (which usually weakens the elastomer) and reducing friction between the elastomer and its seal so that, as the pressure changes, the elastomer can slide across the seat instead of sticking and so being stretched or twisted and possibly torn.

In connection with the teachings herein, various analyses and/or analytical components may be used, including digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention.

What is claimed is:

1. An apparatus for performing a downhole operation, comprising:
    a carrier configured to be disposed in a borehole in an earth formation;
    a deformable component configured to be disposed in the borehole, the deformable component including an elastomeric material and a barrier coating disposed on a surface of the elastomeric material, the barrier coating having a hardness that is greater than a hardness of the elastomeric material, the barrier coating including a first layer of a diamond-like carbon (DLC) material having properties configured to resist permeation of downhole gases from the borehole into the elastomeric material at downhole temperatures and pressures and prevent explosive decomposition of the elastomeric material, the properties of the DLC material including a percentage of $sp^3$ bonds in the DLC material that is at least about seventy percent, the barrier coating including a second layer made from an inorganic material that is different than the DLC material.

2. The apparatus of claim 1, wherein the deformable component is a sealing component configured to provide a fluid tight seal.

3. The apparatus of claim 1, wherein the first layer includes multiple layers of the DLC material.

4. The apparatus of claim 1, wherein the first layer includes a continuous layer of the DLC material deposited directly on the surface of the elastomeric material.

5. The apparatus of claim 1, wherein the barrier coating is a thin coating having a thickness that is small enough to deform with the elastomeric material while retaining resistance to gas permeation.

6. The apparatus of claim 5, wherein the first layer has a thickness that is between about 20 nm and about 40 nm.

7. The apparatus of claim 1, wherein the second layer includes at least one of a silicon dioxide and an aluminum oxide material.

8. The apparatus of claim 1, wherein the carrier includes a connection mechanism configured to connect downhole components of the carrier, and the elastomeric component is a sealing component configured to provide a fluid-tight seal between the downhole components.

9. The apparatus of claim 1, wherein the carrier includes a fluid sampling tool having at least on fluid conduit configured to advance downhole fluids through the tool, and the elastomeric component is a sealing component configured to provide a fluid-tight seal around a portion of the at least one fluid conduit.

10. The apparatus of claim 1, further comprising a protective coating surrounding the barrier coating.

11. A sealing apparatus, comprising:
    a deformable component configured to be disposed in a borehole in an earth formation an provide a fluid-tight seal between downhole components or between a downhole component and a borehole, the deformable component including an elastomeric material and a barrier coating having a hardness that is greater than a hardness of the elastomeric material, the barrier coating including a layer of a diamond-like carbon (DLC) material having properties configured to resist permeation of downhole gases from the borehole into the elastomeric material at downhole temperatures and pressures and prevent explosive decomposition of the elastomeric material, the properties of the DLC material including a percentage of $sp^3$ bonds in the DLC material that is at least about seventy percent.

12. The apparatus of claim 11, wherein the deformable component is selected from at least one of an O-ring, a bladder and a packer element.

13. The apparatus of claim 11, wherein the barrier coating is a single continuous layer of an inorganic material deposited directly on the surface of the elastomeric material.

14. The apparatus of claim 11, wherein the barrier coating includes an additional layer of an inorganic material selected from at least one of a silicon dioxide and an aluminum oxide material.

15. The apparatus of claim 11, wherein the barrier coating includes multiple layers of inorganic material, each of the layers having a thickness of between about 20 nm and about 40 nm.

16. The apparatus of claim 11, wherein the deformable component is disposed as part of a connection mechanism configured to connect downhole components.

17. The apparatus of claim 11, wherein the deformable component is disposed as part of a fluid sampling tool having at least on fluid conduit configured to advance downhole fluids through the tool, the deformable component configured to provide a fluid-tight seal around a portion of the at least one fluid conduit.

18. An apparatus for performing a downhole operation, comprising:
    a carrier configured to be disposed in a borehole in an earth formation;
    a deformable component configured to be disposed in the borehole, the deformable component including an elastomeric material and a barrier coating disposed on a surface of the elastomeric material, the barrier coating having a hardness that is greater than a hardness of the elastomeric material, the barrier coating including a layer of a diamond-like carbon (DLC) material having properties configured to resist permeation of downhole gases from the borehole into the elastomeric material at downhole temperatures and pressures and prevent explosive decomposition of the elastomeric material, the properties of the DLC material including a percentage of $sp^3$ bonds in the DLC material that is at least about seventy percent, the barrier coating having a thickness that is small enough to deform with the elastomeric material while retaining resistance to gas permeation, wherein the deformable component is a sealing component configured to provide a fluid tight seal.

19. The apparatus of claim 18, further comprising a protective coating surrounding the barrier coating.

\* \* \* \* \*